(12) United States Patent
Mu et al.

(10) Patent No.: US 6,731,035 B2
(45) Date of Patent: May 4, 2004

(54) APPARATUS FOR GENERATING AUTOGENIC ENERGY

(75) Inventors: Chung-Nan Mu, Taipei (TW); Yu-Ta Tu, Hsin-chu (TW)

(73) Assignee: Sunyen Co., Ltd., Taipei (TW)

( * ) Notice: Subject to any disclaimer, the term of this patent is extended or adjusted under 35 U.S.C. 154(b) by 0 days.

(21) Appl. No.: 10/103,118

(22) Filed: Mar. 22, 2002

(65) Prior Publication Data

US 2002/0135251 A1 Sep. 26, 2002

Related U.S. Application Data

(60) Provisional application No. 60/278,424, filed on Mar. 26, 2001.

(51) Int. Cl.$^7$ .................................................. H02K 7/06
(52) U.S. Cl. ......................................... 310/80; 310/103
(58) Field of Search ................................ 310/152, 103, 310/80, 12, 23, 24, 34, 35, 96–99

(56) References Cited

U.S. PATENT DOCUMENTS

| | | | | |
|---|---|---|---|---|
| 3,864,587 A | * | 2/1975 | Landry | 310/103 |
| 3,895,245 A | * | 7/1975 | Bode | 310/46 |
| 3,967,146 A | * | 6/1976 | Howard | 310/80 |
| 4,082,969 A | * | 4/1978 | Kelly | 310/103 |
| 4,169,983 A | * | 10/1979 | Felder | 310/46 |
| 4,196,365 A | * | 4/1980 | Presley | 310/23 |
| 4,207,773 A | * | 6/1980 | Stahovic | 74/25 |
| 4,300,067 A | * | 11/1981 | Schumann | 310/80 |

* cited by examiner

Primary Examiner—Tran N. Nguyen
(74) Attorney, Agent, or Firm—Bacon & Thomas, PLLC

(57) ABSTRACT

An apparatus for generating autogenic energy includes a base, a first magnetic device, a second magnetic device and a transmission member. The transmission member is mounted movably on the base. The second magnetic device is connected to the transmission member and is movable together with the transmission member in a predetermined rotational direction by the interaction force of the first and second magnetic devices. The second magnetic device is capable of being disposed adjacent to the first magnetic device in an interaction position and is receives a positive force such that the second magnetic device is rotatable away from the first magnetic device in a first rotational direction to produce an angular momentum. The second magnetic device and the transmission member respond to the inertial force and the positive force to be moved past a counterbalance position without being stopped by a negative force and to continue moving in the first direction back to the interaction position. In this way, the transmission member is movable by means of intermittent exertion of the positive force on the second magnetic device continuously in the predetermined direction.

15 Claims, 3 Drawing Sheets

APPARATUS FOR GENERATING AUTOGENIC ENERGY

This application claims the benefit of Provisional application Ser. No. 60/278,434, filed Mar. 26, 2001.

BACKGROUND OF THE INVENTION

1. Field of the Invention

This invention relates to an energy conversion mechanism, and more particularly to an apparatus that uses magnets to sustain rotation of a transmission member or flywheel after an initial external power input, the rotation sustaining energy generated by the magnets to sustain rotation of the transmission member of flywheel after the initial energy input hereinafter being referred to as "autogenic energy." The mechanism produces long-sustained energy without causing environmental concerns.

2. Description of the Related Art

It is well known that energy to provide heat, lighting and power can be obtained from several sources. Most energy used today is obtained from fossil fuels, such as crude petroleum, natural gas, and coal. These fossil fuels are used, for example, by an engine to run a car or by a turbine to drive a generator for the production of electricity. However, this process of burning fossil fuels unavoidably results in air pollution problems. In addition, the total amount of the fossil fuels in the earth's crust is decreasing rapidly due to the high rate of consumption of the earth's increasing population. Therefore, the energy obtainable from these fossil fuels is limited and may be exhausted sometime in the near future.

More recently, nuclear fuels have become an important source of energy. For example, nuclear fuels have become widely used, primarily to produce electricity with nuclear power plants. Although a virtually unlimited amount of nuclear fuel can be obtained, the normal process of nuclear fission by which it is converted to usable energy in the nuclear power plant, has raised serious safety concerns. Concerns also have been raised regarding the safety of known methods of disposal of nuclear waste.

In some instances, solar, wind, and tidal energy may be used to generate electricity. However, sources of solar, wind, and tidal energy are limited, and the overall quantities of energy obtained from such sources cannot at this time even begin to match the energy demands of our society.

SUMMARY OF THE INVENTION

Therefore, an object of the invention is to provide an apparatus for utilizing long-sustained autogenic energy. Another object of the invention is to provide a mode of energy exploitation that will not harm the environment.

According to the invention, an apparatus for producing autogenic energy includes a base, a first magnetic device, a second magnetic device and a transmission member. The first magnetic device is mounted on the base and has a first magnetic field. The transmission member is mounted movably on the base. The second magnetic device is connected to the transmission member and has a second magnetic field. The second magnetic device is movable together with the transmission member in a first rotational direction (such as clockwise) to pass by the first magnetic device periodically adjacent to what is herein referred to as an "interactive position"). The first and second magnetic fields interact with one another when the second magnetic device passes by the first magnetic device to exert alternately positive and negative forces on the first and second magnetic devices. Both forces are repulsive since in the present (preferred) arrangement, like poles are always closer than opposite poles. The positive force urges the second magnetic device to move relative to the first magnetic device in the first rotational direction (such as in a clockwise direction). The negative force urges the second magnetic device to move relative to the first magnetic device in a second rotational direction (such as the counter-clockwise direction) that is opposite to the first rotational direction. The second magnetic device is arranged to move toward and away from the first magnetic device, that is, from an interaction position adjacent to the first magnetic device where the positive force is exerted such that the second magnetic device moves away from the first magnetic device in the first rotational direction to produce an inertial force (angular momentum). The second magnetic device together the transmission member is caused by the inertial force (angular momentum), primarily of a flywheel on the transmission member, and the positive force to move through a portion of its path where the magnetic force is negative. That path portion begins at a position, hereinafter referred to as a "counterbalance position," where the magnets are distant from each other and the force changes from positive to negative. The inertial force (angular momentum) during this movement, again primarily maintained by a flywheel, is sufficient that the second magnetic device returns in the first direction to and past the interactive position, where the positive force is again exerted so that such movement of the second magnetic device continues repeatedly. That is, the second magnetic device thereby can move periodically from the interaction position through the counterbalance position, and back to the interaction position, by means of the movement of the transmission member in order to maintain an exertion of the positive force on the second magnetic device by virtue of the interaction of the first and second magnetic fields and the inertial force (angular momentum), resulting in continuous movement of the transmission member in the first rotational direction.

BRIEF DESCRIPTION OF THE DRAWINGS

There and other features and advantages of the invention will become apparent in the following detailed description of the preferred embodiments of the invention, with reference to the accompanying drawings in which.

DETAILED DESCRIPTION OF THE PREFERRED EMBODIMENTS

Figure 1:
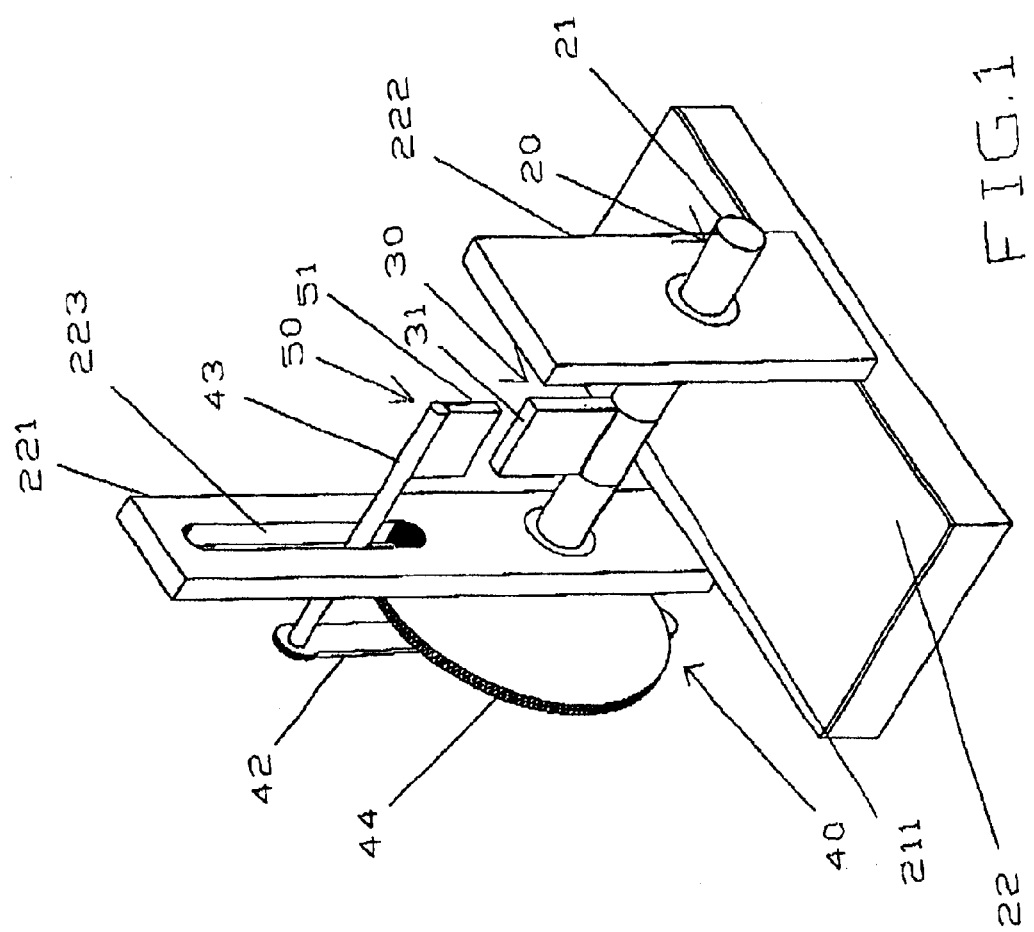
FIG. 1 is a perspective view of a preferred embodiment of an apparatus for the production of autogenic energy according to the invention.

Before considering the invention in detail, it should be noted that like elements are denoted by the same reference numerals throughout the disclosure.

Referring to FIG. 1, a preferred embodiment of an apparatus for autogenic energy according to the invention is shown to include a base 22, a first magnetic device 50, a second magnetic device 30, a transmission member 20, and a linking device 40.

Figure 2:
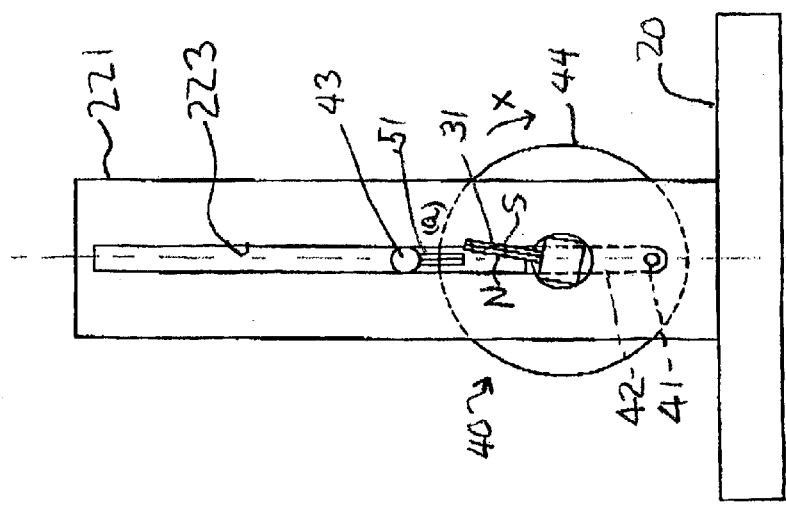
FIG. 2 is a side view of the apparatus of the embodiment in a first operative position (an interaction position)

The base 22 has first and second support plates 221, 222 extending upwardly therefrom in a parallel relationship. The transmission member 20 has a horizontal shaft 21 extending transversely through, and journalled to, the first and second support plates 221, 222. As a result, the shaft 21 is rotatable about its longitudinal axis. The linking device 40 has a guide slot 223 formed in the first support plate 221 and extending in a vertical direction. The first magnetic device 50 has a first magnet 51. The second magnetic device 30 has a second magnet 31 fixed to a rectangular intermediate portion 211 of the shaft 21, as is best illustrated in FIG. 2. The first and second magnets 51 and 31 are permanent magnets made of a material of high magnetism, high coercive force and low oxidization {or of a low oxidation rate), such as a magnet formed from Nd, Fe and B. As such, the first and second magnets 51 and 31 have strong torque properties and are capable of rotation at high speeds. The second magnet 31 extends radially from the shaft 21 and is located between the first and second support plates 221, 222.

The linking device 40 further has a link in the form of linking rod 42, and also a connection rod 43 and a disk or flywheel 44. The disk 44 is fixed coaxially to the horizontal shaft 21 adjacent to the first support plate 221 and serves to store kinetic energy. The linking rod 42 has a first end connected eccentrically and pivotally to the disk 44 at a pivot point 41. A second end of the linking rod 42 is pivotally connected to a first end of the connection rod 43. As can be seen, for example in FIG. 2, the pivot point 41 is connected to the disk 44 at such a point that when it is at its lowest position (180 degrees from the top), the second magnet extends at about ten degrees (by way of example) from the vertical. The first magnet 51 is connected to the second end of the connection rod 43. The connection rod 43 extends horizontally through the guiding slot 223 in the first plate 221 such that the first magnet 51 is located above the second magnetic device 30, and so as to be vertically movable in the same vertical plane as that in which the second magnet 31 rotates, as will be described below. Each of the first and second magnets 51 and 31 has north (N) and south (S) magnetic poles that are juxtaposed to one another in a direction transverse to the longitudinal axis of the shaft 21.

The invention makes use of the fact that the magnetic force between two magnet poles is proportional to the product of the magnet field strengths of the magnets and inversely proportional to the square of the distance between the poles. Therefore, the longer the distance the less that magnetic force between the magnets. The apparatus is arranged so that like poles of the first and second magnets are always closest, whereby a net repelling force is always present between them. The apparatus is further arranged so that along the portion of the path of the revolving second magnet 31 over which the forces between first like poles, say north poles, dominate, the net force is greater than that along the portion of the path over which the forces between second like poles, say south poles, dominate, this when comparing symmetrically opposite positions of the two parts of the path, as will become clearer from the detailed discussion below.

The second magnetic device 30 is rotatable in a vertical plane with the shaft 21 and together with the transmission member 20 and flywheel 44. The rotation is in a first (clockwise) direction as shown by arrow X in FIG. 2 to pass by the first magnetic device 50 periodically. When the second magnetic device 30 is disposed in an interaction position closely adjacent to the first magnetic device 50, for example at the position shown in FIG. 2 about 10 degrees from the vertical (when the first magnet 21 is at its lowest position), the first and second magnetic fields of the first and second magnets 51 and 31 strongly interact with one another. The second magnet 31 passes by the first magnet 51, at which time the respective magnetic fields interact first to exert a net positive force and later a negative force on the first and second magnetic devices 50, 30 before the first magnet again returns to the interaction position shown in FIG. 2. Of course, the force is greater when the magnets are closer than when they are farther apart.

The positive force urges the second magnetic device 30 to move relatively to the first magnetic device 50 in the first rotational direction. The negative force urges the second magnetic device 30 relative to the first magnetic device 50 in a second rotational direction that is opposite to the first direction. More specifically, with reference to FIG. 2, the first magnetic pole (north (N) pole) of the second magnet 31 is located in an area (a) that is adjacent to the first magnetic pole (north (N) pole) of the first magnet 51. At this time, a strong repulsion force is exerted on the first and second magnets 51 and 31. Since the first magnet 51 is nonrotatable in the first and second directions, the components of the repulsion force in the directions in which the magnets 51 and 31 can move (respectively vertically and rotationally) constitute the positive force that drive the second magnet 31, and the shaft 21 and flywheel 44 therewith, to rotate in the first direction X. As the second magnet 31 rotates downward (and the first magnet 51 moves correspondingly upward, the repulsive force between the magnets declines continuously since distance between the magnets increases.

Figure 3:
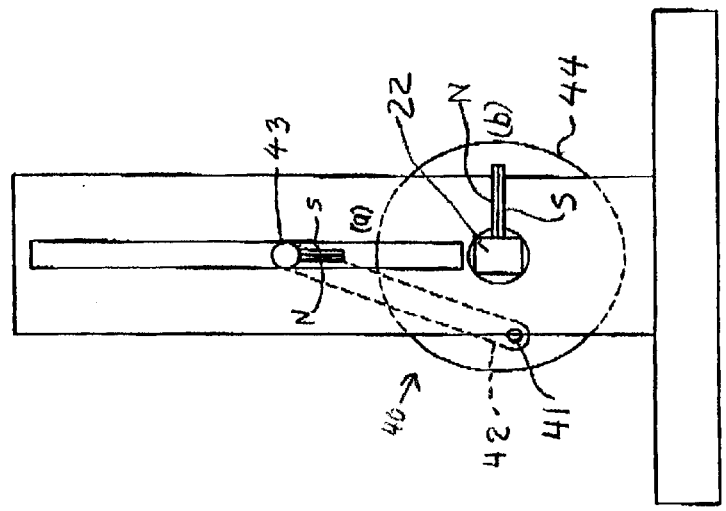
FIG. 3 is a side view of the apparatus of the embodiment in a second operative position (just before a transition (counterbalance) position)

At this stage, the positive force rotates the second magnet 31 and the shaft 21 to drive the disk 44, the linking rod 42 and the connection rod 43 to move the first magnet 51 upwardly along the guiding slot 223 from a first position as shown in FIG. 2 toward a second position or area (b), shown in FIG. 3. Thus, when the second magnet reaches this position (b) farther away from the first magnet 51, at a 90-degree position with its plane surfaces extending horizontally as shown in FIG. 3, the force is still positive but substantially reduced.

Figure 4:
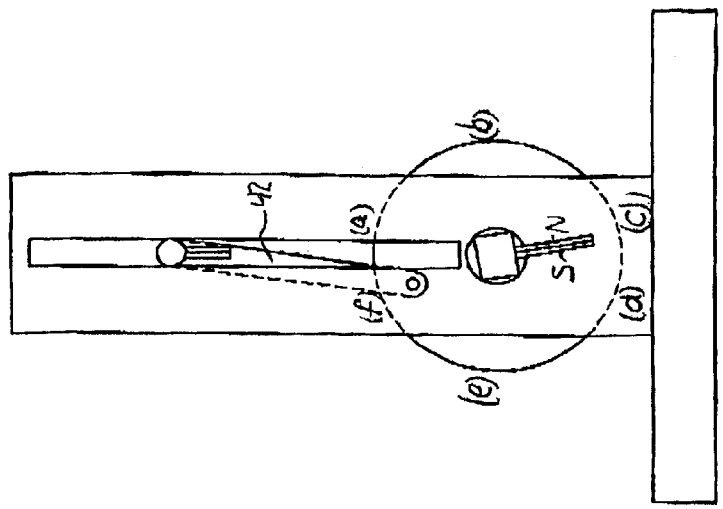
FIG. 4 is a side view of the apparatus of the embodiment in a third operative position (just after the counterbalance position)

FIG. 4 shows a position or area in which the second magnet 31 has rotated farther downward to position (c), in which area the second magnet 31 has reached close to (in the illustrated embodiment about ten degrees short of) the bottom of its circular path. At this position, the first magnet 51 is still moving upward as the pivot point 41 is approaching (is about 20 degrees short of) its highest point. Of course when the second magnet 51 reaches the bottom of its arc extending vertically downward (a transition or "counterbalance" position), the magnetic force between the magnets is momentarily zero, with positive and negative forces balancing each other. Momentum, however, keeps the second magnet 31 rotating in the first (clockwise direction), which is now an upward direction.

Figure 5:
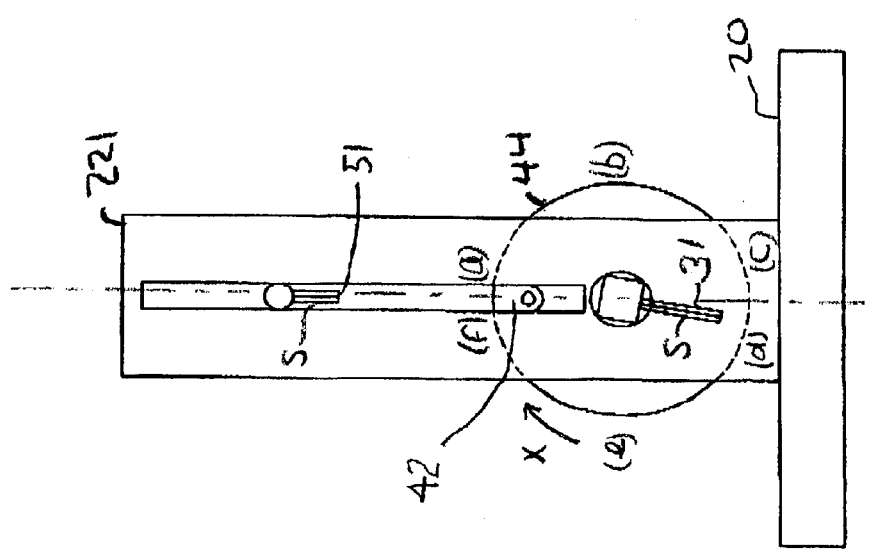
FIG. 5 is a side view of the apparatus of the embodiment in a fourth operative position.

A short farther rotation of the second magnet 31 brings it to an area (d) (about ten degrees past the bottom (counterbalance) position, as shown in FIG. 5, where the pivot point 41 of the linking rod 42 and the first magnet 31 reach their maximum upward position. At this position a minimal negative force is being exerted on the first and second magnets 51 and 31, due to repulsion between the second (south) poles of the two magnets, that urges the second magnet 31 in the second (counterclockwise) direction. It may be noted that, perhaps significantly, the force on the second magnet 31 although negative, is less in magnitude at position (d) than is the positive force at the symmetrically opposite (opposite side relative to the vertical 0/180-degree line) position (c), as can be seen from comparison of FIGS. 4 and 5. For example, in this embodiment, whereas at position (c), the pivot point is 20 degrees from its peak position, at position (d) the pivot point is at the peak position so that the first magnet 51 is farther from the second magnet 31.

Figure 6:
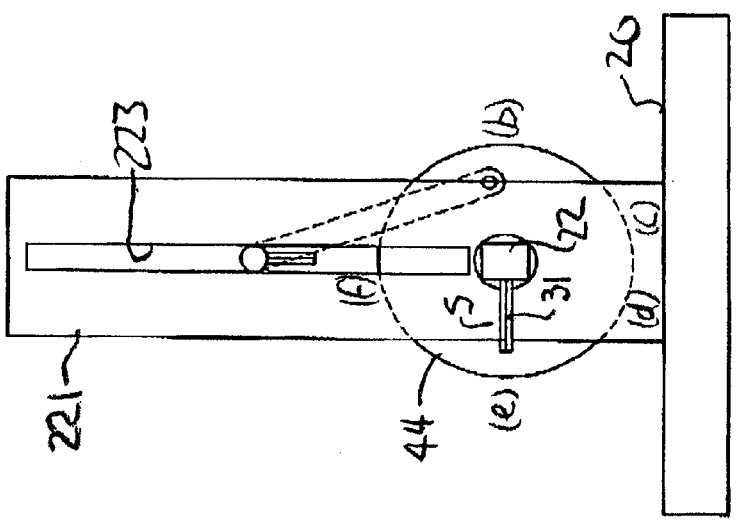
FIG. 6 is a side view of the apparatus of the embodiment in a fifth operative position.

Momentum overcomes the negative force now being applied between the magnets. Referring next to FIG. 6, when the second magnet 31 further rotate to the position (e), which is opposite position (b), that is a 90-degree position in which the opposite plane surfaces of the magnet are horizontal, the force on the second magnet 31 is still negative, is greater than the force at position (d), but perhaps significantly, less in magnitude than at the symmetrically opposite (opposite side of the vertical 0/180-degree line) position (b), as can be seen by comparing FIGS. 3 and 6. This is because whereas at position (e) of the second magnet the pivot point 41 is a short distance (e.g. 10 degrees) below its peak, at the position (b) of the second magnet, the pivot point is even farther (e.g. 20 degrees) below its peak. Momentum, maintained primarily by the flywheel 44, continues to overcome the negative (counterclockwise directed) force now being applied on the magnets.

Figure 7:
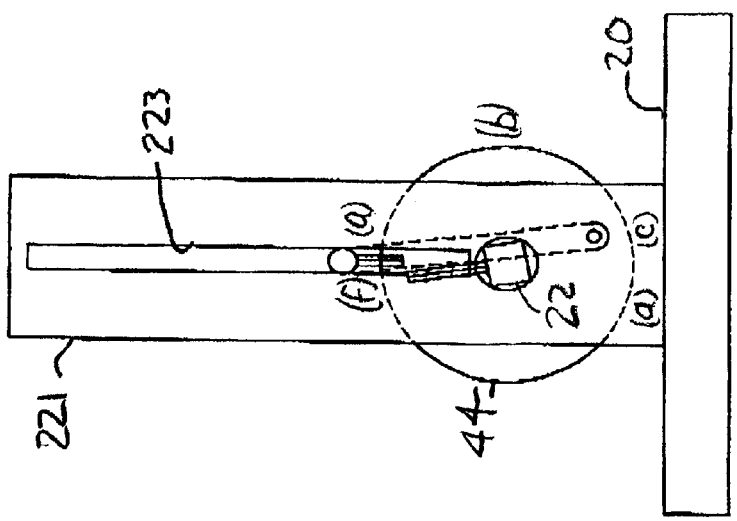
FIG. 7 is side view of the apparatus of the embodiment in a sixth operative position.

Now referring to FIG. 7, the angular momentum even overcomes the negative force when the second magnet 31 reaches position (f) adjacent (in the disclosed embodiment about 10 degrees from) the top of the circular arc path it follows. Here again, perhaps significantly, the negative force on the second magnet 31 while still negative, is less than the positive force at the symmetrically opposite position (a), since at position (f) the first magnet 51 is higher (farther from its lowest point and thus farther from the second magnet 31) than at the position (a), where the first magnet is at its lowest point, as can be seen from a comparison of FIGS. 2 and 7.

Extensive careful testing by the inventor has demonstated that in this manner, the positive force and the inertial force (angular momentum) of primarily the flywheel 44, enables the second magnetic device 30 and the transmission member 20 to move continuously in the first rotational direction without being stopped by the negative force as the first magnetic device 50 moves in the guiding slot 223 in an upward and downward direction. The inventor has found from his extensive testing that the overall effect of the positive force between the magnets while the forces between the first poles of magnets (in the embodiment south poles) predominate, has been greater that the negative force between the second poles of magnets (in the embodiment south poles). That is, even when the second magnet 31 has rotated a full 360 degrees, and even if the second magnet starts from a stationary position and encounters friction and is under a load, it will always have kinetic energy at the 360-degree position. Otherwise stated, the inventor has shown with his extensive experiments, in which some frictional loss was unavoidable and in fact, the shaft 21 was required to drive a positive load, that the second magnet 31 and rotating parts connected thereto rotated continuously in the same direction (in the present example the clockwise direction). Thus, the invention produces a net inward flow of kinetic energy into the flywheel as it rotates continuously counterclockwise without being stopped by the negative force, friction, or a load that may be coupled to the output shaft 21. The inventor has found that a long-sustained kinetic energy is obtained from the device according to the invention.

While the invention has been described in connection with what is considered the most practical and preferred embodiments, it is understood that this invention is not limited to the disclosed embodiments but is intended to cover various arrangements included within the spirit and scope of the broadest interpretations and equivalent arrangements. For example, the movement of the first magnet 51 is not limited to the upward and downward direction. Other directions are certainly possible.

What is claimed is:

1. An apparatus for sustaining rotation of a transmission member by at least one first permanent magnet arranged to repel at least one second permanent magnet, and a linking device for moving the at least one first permanent magnet towards and away from the at least one second permanent magnet in response to rotation of the transmission member so that a net repulsive force is less when the magnets approach each other than when the magnets move apart, comprising:

a base, at least one first magnetic device including the at least one first permanent magnet having a first magnetic field, and at least one second magnetic device, including the at least one second permanent magnet having a second magnetic field that interacts with the first magnetic field, mounted to the transmission member for rotation therewith along a circular path so as to be urged by the magnetic field interaction in a first rotational direction or a second rotational direction opposite the first direction, according to the angular position along the path of the second permanent magnet, wherein the transmission member is rotatably mounted on the base and has a longitudinal axis of rotation, and wherein the linking device couples the at least one first magnetic device to the transmission member, the linking device including a link having a first end and a second end, the first end pivotably connected to the at least one first magnetic device, means, rotating with the transmission member, pivotally supporting the second end of the link at a position radially spaced from the axis of rotation, and means restricting the first magnetic device to movement in a direction toward and away from a first transition position on the circular path, at which position the rotational direction in which the second magnetic device is urged by the magnetic field interaction changes from the first rotational direction to the second rotational direction, the link and the second end pivotally supporting means including mechanical means causing the second magnetic device to move toward and away from the first transition position in synchronism with rotation of the second magnetic device along the circular path, each of the first and second magnets having north and south magnetic poles that are juxtaposed to one another in a direction transverse to the longitudinal axis of the transmission member, such that magnetic fields of the first and second magnets are interactive.

2. The apparatus for sustaining rotation of a transmission member as claimed in claim 1, further comprising a flywheel, connected concentrically to the transmission member, for storing kinetic energy as angular momentum as the first magnetic member and the transmission member rotate about the longitudinal axis.

3. The apparatus for sustaining rotation of a transmission member as claimed in claim 1, wherein the flywheel includes the second end pivotally supporting means so that the flywheel pivotally supports the second end of the link.

4. The apparatus for sustaining rotation of a transmission member as claimed in claim 2, wherein the link is a single straight rod.

5. The apparatus for sustaining rotation of a transmission member as claimed in claim 1, wherein the base includes a guide member and the restricting means includes a guiding slot in the guide member, the guiding slot being elongated in the direction toward and away from a first transition position, the linking device further comprising a connection rod, the connection pivotally connected to the link first end and extending through the guiding slot into connection with the first magnetic device.

6. The apparatus for sustaining rotation of a transmission member as claimed in claim 1, wherein the linkage device directs the first magnetic device to its closest position to the circular path when the first magnet is just past the first transition position, and wherein the linkage device directs the first magnetic device to a farthest position of said first magnetic device from the circular path when the first magnet is just past a second transition position at which the rotational direction in which the second magnetic device is urged by the magnetic field interaction changes from the second rotational direction to the first rotational direction.

7. The apparatus for sustaining rotation of a transmission member as claimed in claim 6, wherein the link is a single straight rod, and the slot and the first and second transition positions are in a same plane.

8. The apparatus for sustaining rotation of a transmission member as claimed in claim 7, wherein the link is a single straight rod, and wherein the first and second transitional positions are in linear alignment with the first magnet.

9. The apparatus for sustaining rotation of a transmission member as claimed in claim 6, wherein the link is a single straight rod, and wherein the first and second transitional positions are in linear alignment with the first magnet.

10. An Apparatus for sustaining rotation of a transmission member by at least one first permanent magnet arranged to repel at least one second permanent magnet, and a linking device for moving the at least one first permanent magnet towards and away from the at least one second permanent magnet in response to rotation of the transmission member so that a net repulsive force is less when the magnets approach each other than when the magnets move apart, comprising:

a base having a guide member, at least one first magnetic device including the at least one first permanent magnet having a first magnetic field, and at least one second magnetic device, including the at least one second permanent magnet having a second magnetic field that interacts with the first magnetic field, mounted to the transmission member for rotation therewith along a circular path so as to be urged by the magnetic field interaction in a first rotational direction or a second rotational direction opposite the first direction, according to the angular position along the path of the second permanent magnet, wherein the transmission member is rotatably mounted on the base and has a longitudinal axis of rotation, and wherein the linking device couples the at least one first magnetic device to the transmission member, the linking device including a connection rod connected at one end to the at least one first magnetic device, a linking rod having a first end and a second end, the first end pivotably connected to another end of the connection rod, means, rotating with the transmission member, pivotally supporting the second end of the linking rod at a position radially spaced from the axis of rotation, means restricting the first magnetic device to movement in a direction toward and away from a first transition position on the circular path, at which position the rotational direction in which the second magnetic device is urged by the magnetic field interaction changes from the first rotational direction to the second rotational direction, the linking rod and the second end pivotally supporting means including mechanical means causing the second magnetic device to move toward and away from the first transition position in synchronism with rotation of the second magnetic device along the circular path, each of the first and second magnets having north and south magnetic poles that are juxtaposed to one another in a direction transverse to the longitudinal axis of the transmission member, such that magnetic fields of the first and second magnets are interactive, the restricting means including a guiding slot in the guide member, the guiding slot being elongated in the direction toward and away from a first transition position, and a flywheel, connected concentrically to the transmission member, for storing kinetic energy as angular momentum as the first magnetic member and the transmission member rotate about the longitudinal axis, wherein the slot and the first and second transition positions are in a same plane, the first and second transitional positions are in linear alignment with the first magnet, and the linkage device directs the first magnetic device to a closest position of said first magnetic device to the circular path when the first magnet is just past the first transition position, and wherein the linkage device directs the first magnetic device to a farthest position of said first magnetic device from the circular path when the first magnet is just past a second transition position at which the rotational direction in which the second magnetic device is urged by the magnetic field interaction changes for the second rotational direction to the first rotational direction.

11. An apparatus for sustaining movement of a transmission member in a rotational direction by magnetic repulsion that varies as the transmission member rotates, comprising:

a base, at least one first magnetic device mounted on the base and having a first magnetic field, and at least one second magnetic device connected to the transmission member and having a second magnetic field, the transmission member being mounted movably on the base, and the second magnetic device being movable together with the transmission member in a first rotational direction periodically to pass by the first magnetic device, the first and second magnetic fields interacting with one another when the second magnetic device passes by the first magnetic device alternately to exert on the and second magnetic devices a positive interactive force urging the second magnet to move in a first rotational direction, and a negative interactive force urging the second magnet to move in a second rotational direction opposite the first direction, the second magnetic device rotating past the first magnetic device at which the interactive force switches from positive to negative, to an interaction position adjacent to the first magnetic device at which the interactive force changes from negative to positive, and away from the interactive position and the first magnetic device to produce an inertial force and the positive force to move the second magnetic device and the transmission member to pass through a counterbalance position at which the interactive force switches from positive to negative, and to move back to the interaction position in the first direction without being stopped by the negative force, the second magnetic device thereby moving periodically between the interaction position and the counterbalance position by means of movement of the transmission member, in order to maintain exertion of the positive force on the second magnetic device by virtue of the interaction of the first and second magnetic fields and the inertial force, resulting in continuous movement of the transmission member in the first direction without being stopped by the negative force; wherein the transmission member is connected to a linking device, said linking device including a link having a first end and a second end, the first end pivotably couples one of the first magnetic device and the second magnetic device to the transmission member.

12. The apparatus for sustaining movement of a transmission member as claimed in claim 11, wherein the transmission member, via coupling to the liking device, is connected to one of the first and-second magnetic devices so that the first and second magnetic fields interact with one another to move the second magnetic device in the first direction toward the counterbalance position when the second magnetic device is in the interaction position, the first and second magnetic devices being movable relatively to one another in a third direction to a first position in which the second magnetic device is adjacent to the first magnetic device and the positive interactive force is exerted on the first and second magnetic devices, and to a second position in which the first and second magnetic devices are distal from one another, where the negative force is minimized, the positive force and the inertial force thereafter being exerted on the second magnetic device so as to urge the second magnetic device and the transmission member to move in the first direction without being stopped by the negative force, thereby one of the first and second magnetic devices is movable between the first and second positions by means of the movement of the transmission member, and thereby the transmission member is movable continuously in the first direction without being stopped by the negative force by means of intermittent exertion of the positive force on the second magnetic device.

13. The apparatus for sustaining movement of a transmission member as claimed in claim 12, wherein the base has first and second support plates extending upwardly therefrom in a parallel relationship, the transmission member including a shaft extending transversely through and journalled to the first and second support plates, wherein the first magnetic device has at least one first magnet, the second magnetic device having at least one second magnet fixed to the shaft, the second magnet extending radially from the shaft and being located between the first and second support plates, wherein the linking device further has a circular disk fixed coaxially to the shaft adjacent to the first support plate, a linking rod having a first end connected eccentrically and pivotally to the disk and a second end, and a connection rod having a first end connected pivotally to the second end of the linking rod, and wherein the at least one first magnet is connected to a second end of the connection rod, the connection rod extending through the guiding slot of the first plate such that the at least one first magnet is located above the at least one second magnet and is movable together with the connection rod up and down between the first and second positions, to move toward and away from the at least one second magnet when the disk is rotated by the shaft.

14. The apparatus for sustaining movement of a transmission member as claimed in claim 13, wherein the first and second magnets are permanent magnets.

15. The apparatus for sustaining movement of a transmission member as claimed in claim 14, wherein each of the first and second magnets has first and second magnetic poles that are juxtaposed to one another in a direction transverse to the shaft.

* * * * *